United States Patent
Edgar et al.

(10) Patent No.: US 9,031,842 B2
(45) Date of Patent: May 12, 2015

(54) METHODS AND DEVICES FOR FACILITATING COMMUNICATIONS

(75) Inventors: Robbie Donald Edgar, Guelph (CA); Luke Stephen Allen, Kitchener (CA); Farhoud Shirzadi, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 250 days.

(21) Appl. No.: 13/583,296

(22) PCT Filed: Jul. 28, 2011

(86) PCT No.: PCT/CA2011/050465
§ 371 (c)(1),
(2), (4) Date: Sep. 7, 2012

(87) PCT Pub. No.: WO2013/013290
PCT Pub. Date: Jan. 31, 2013

(65) Prior Publication Data
US 2013/0096917 A1    Apr. 18, 2013

(51) Int. Cl.
G10L 17/00    (2013.01)
G10L 15/00    (2013.01)
H04M 1/656    (2006.01)
H04M 1/27    (2006.01)
H04M 1/57    (2006.01)

(52) U.S. Cl.
CPC ............ *G10L 15/00* (2013.01); *G10L 17/00* (2013.01); *H04M 1/656* (2013.01); *H04M 1/271* (2013.01); *H04M 1/575* (2013.01)

(58) Field of Classification Search
USPC ................... 704/246–250, 273, 276
See application file for complete search history.

(56) References Cited

U.S. PATENT DOCUMENTS

| | | | | |
|---|---|---|---|---|
| 5,465,290 A | * | 11/1995 | Hampton et al. | 379/88.02 |
| 5,646,839 A | * | 7/1997 | Katz | 379/142.11 |
| 7,430,287 B2 | * | 9/2008 | Daugherty et al. | 379/145 |
| 8,630,682 B2 | * | 1/2014 | Garcia | 455/557 |

(Continued)

FOREIGN PATENT DOCUMENTS

| | | |
|---|---|---|
| EP | 1739937 | 1/2007 |
| WO | WO2008/008729 | 1/2008 |

OTHER PUBLICATIONS

International Search Report dated Mar. 26, 2012.

(Continued)

*Primary Examiner* — Abul Azad
(74) *Attorney, Agent, or Firm* — Rowand LLP

(57) ABSTRACT

Methods and electronic devices for facilitating communications are described. In one aspect, a method for facilitating communications is described. The method includes: monitoring audio based communications; performing an audio analysis on the monitored audio based communications to identify a contact associated with the monitored communications; and providing information associated with the identified contact on an electronic device. In another aspect, an electronic device is described. The electronic device includes a processor and a memory coupled to the processor. The memory stores processor readable instructions for causing the processor to: monitor audio based communications; perform an audio analysis on the monitored audio based communications to identify a contact associated with the monitored communications; and provide information associated with the identified contact on an electronic device.

20 Claims, 8 Drawing Sheets

(56) References Cited

U.S. PATENT DOCUMENTS

| | | | |
|---|---|---|---|
| 8,706,485 B2* | 4/2014 | Martensson | 704/235 |
| 2004/0013252 A1 | 1/2004 | Craner | |
| 2005/0239511 A1 | 10/2005 | Boillot et al. | |
| 2006/0013446 A1* | 1/2006 | Stephens | 382/115 |
| 2007/0201683 A1 | 8/2007 | Saiin et al. | |
| 2007/0223682 A1 | 9/2007 | Uusitalo | |
| 2009/0110173 A1* | 4/2009 | Elvang-Goransson | 379/210.01 |
| 2009/0201768 A1 | 8/2009 | Adams | |
| 2009/0252314 A1 | 10/2009 | Cassanego et al. | |
| 2009/0275316 A1* | 11/2009 | Springer | 455/415 |
| 2011/0288866 A1* | 11/2011 | Rasmussen | 704/246 |

OTHER PUBLICATIONS

EPO, Extended European Search Report relating to application No. 11869987.5, dated Nov. 11, 2014.

* cited by examiner

METHODS AND DEVICES FOR FACILITATING COMMUNICATIONS

TECHNICAL FIELD

The present disclosure relates to electronic devices and, more particularly, to methods and electronic devices for facilitating communications.

BACKGROUND

When a party is engaged in a conversation with another party, they sometimes forget to discuss a subject which they intended to discuss. For example, one party may intend to ask the other party about a recent vacation, but may forget to raise this topic during a conversation.

In some cases when a conversation occurs the participants in the conversation may struggle to find something to discuss; awkward conversation or silence may ensue.

BRIEF DESCRIPTION OF THE DRAWINGS

Like reference numerals are used in the drawings to denote like elements and features.

DETAILED DESCRIPTION OF EXAMPLE EMBODIMENTS

In one aspect, the present disclosure describes a method for facilitating communications. The method includes: monitoring audio based communications; performing an audio analysis on the monitored audio based communications to identify a contact associated with the monitored communications; and providing information associated with the identified contact on an electronic device.

In another aspect, the present disclosure describes an electronic device. The electronic device includes a processor and a memory coupled to the processor. The memory stores processor readable instructions for causing the processor to: monitor audio based communications; perform an audio analysis on the monitored audio based communications to identify a contact associated with the monitored communications; and provide information associated with the identified contact on an electronic device.

In yet another aspect, the present disclosure describes a non-transitory computer readable storage medium including computer executable instructions for: monitoring audio based communications; performing an audio analysis on the monitored audio based communications to identify a contact associated with the monitored communications; and providing information associated with the identified contact on an electronic device.

In yet a further aspect, the present disclosure describes a method for triggering a reminder on an electronic device. The method includes: associating a reminder with a contact; monitoring audio based communications; performing an audio analysis on the monitored communications to determine whether the contact associated with the reminder is a participant in the communications; and in response to determining that the contact associated with the reminder is a party to the communications triggering the reminder.

Other example embodiments of the present disclosure will be apparent to those of ordinary skill in the art from a review of the following detailed description in conjunction with the drawings.

As will be described in greater detail below, at least some example embodiments of the present disclosure describe electronic devices (such as a mobile communication device), methods, communication systems, and computer-readable mediums for providing notifications on an electronic device. The notifications which are provided include notification information which is associated with a contact on an electronic device.

For example, in some example embodiments which will be discussed in greater detail below, a user of an electronic device may store a reminder in a memory of the electronic device and may associate that reminder with a contact. The reminder may for example, be a user-specified text based reminder. Later, when the user is engaged in a conversation with the contact associated with the reminder, the electronic device may trigger the reminder in order to remind the user of the device of the information in the reminder.

Example Electronic Device

Figure 1:
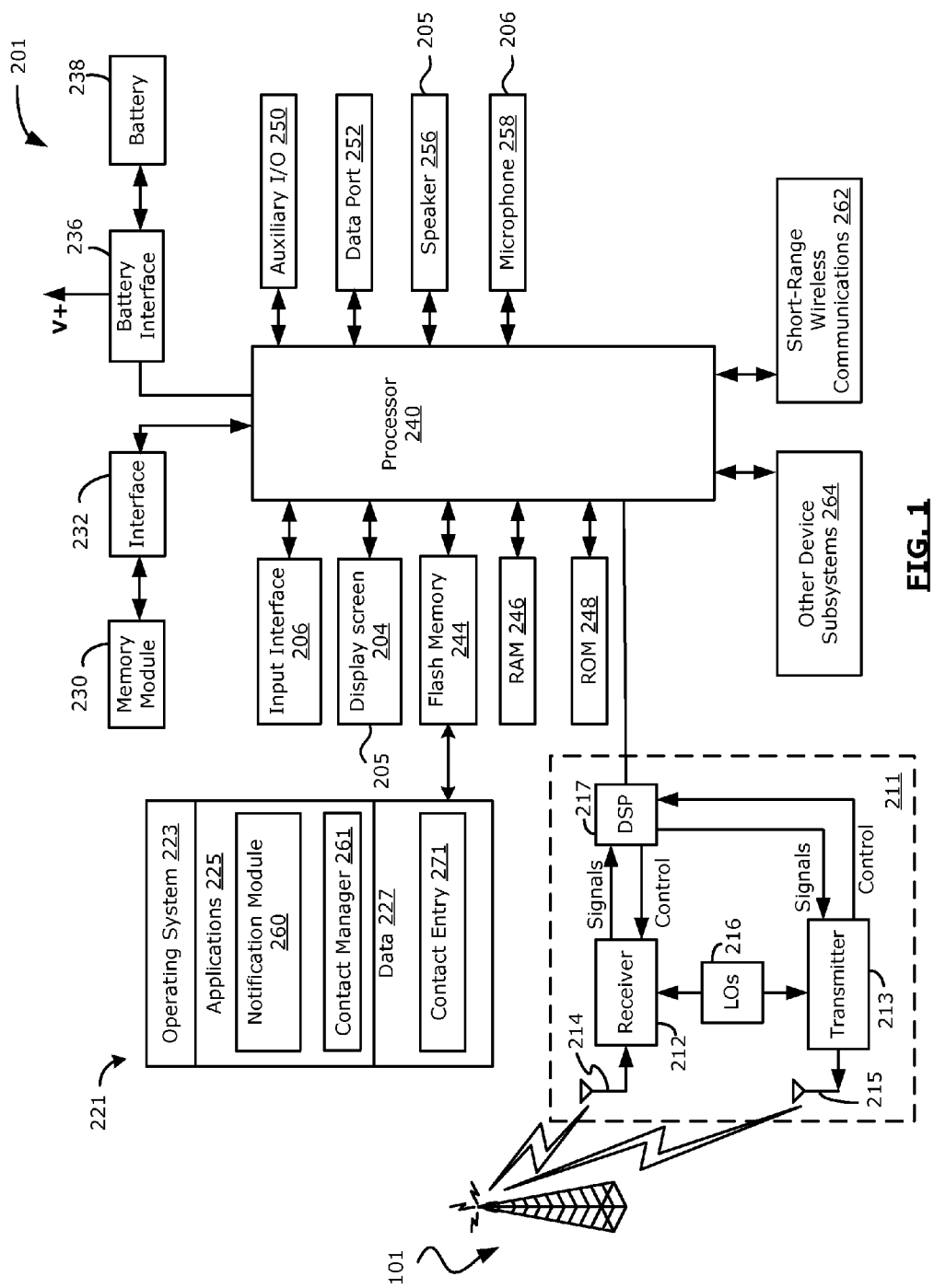
FIG. 1 is a block diagram illustrating an electronic device in accordance with example embodiments of the present disclosure.

Reference will now be made to FIG. 1 which illustrates an example electronic device 201 in which example embodiments described in the present disclosure can be applied. In the illustrated example embodiment, the electronic device 201 is a communication device and, more particularly, is a mobile communication device having data and voice communication capabilities, and the capability to communicate with other computer systems; for example, via the Internet. Depending on the functionality provided by the electronic device 201, in various example embodiments the electronic device 201 may be a multiple-mode communication device configured for both data and voice communication, a smartphone, a tablet computer, a mobile telephone or a PDA (personal digital assistant) enabled for wireless communication, or a computer system. The electronic device may also be referred to as a mobile communications device, a communication device, a mobile device and, in some cases, as a device.

The electronic device 201 includes a controller including one or more processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 is communicably coupled with additional device subsystems including one or more output interfaces 205 (such as a display screen 204 and/or a speaker 256), one or more input interfaces 206 (such as a microphone 258, keyboard (not shown), control buttons (not shown), a navigational input device (not shown), and/or a touch-sensitive overlay (not shown)), memory (such as flash memory 244, random access memory (RAM) 246, read only memory (ROM) 248, etc.), auxiliary input/output (I/O) subsystems 250, data port 252 such as serial data port, such as a Universal Serial Bus (USB) data port, short-range communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display). The touchscreen display may be constructed using a touch-sensitive input surface connected to an electronic controller and which overlays the display screen 204. The touch-sensitive overlay and the electronic controller provide a touch-sensitive input interface 206 and the processor 240 interacts with the touch-sensitive overlay via the electronic controller.

The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate.

The mobile communication device 201 may communicate with any one of a plurality of fixed transceiver base stations of the wireless network 101 within its geographic coverage area. The mobile communication device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some example embodiments, the auxiliary input/output (I/O) subsystems 250 may include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some example embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short-range communication subsystem 262 is an additional optional component which provides for communication between the electronic device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

The electronic device 201 stores data 227 in an erasable persistent memory, which in one example embodiment is the flash memory 244. In various example embodiments, the data 227 includes service data including information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 may, in some example embodiments, be a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 may also compose data items, such as email messages; for example, using the input devices in conjunction with the display screen 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 such a contact manager 261 and a notification module 260. In the example embodiment of FIG. 1, the contact manager 261 and the notification module 260 are implemented as separate stand-alone applications 225. However, in other example embodiments, one or more of these applications (i.e. notification module 260 and/or the contact manager 261) could be implemented as part of the operating system 223 or another application 225.

In some example embodiments, any of the functions performed by any combination of the notification module 260 and/or the contact manager 261 may be realized in a common application. For example, the notification module 260 and the contact manager 261 may be implemented as a single application which provides the functions of the notification module 260 and the contact manager 261. For example, in at least some example embodiments, the notification module 260 may be included in the contact manager 261.

The contact manager 261 performs the functions of an address book and allows contact entries 271 to be created and stored in the memory. The contact manager 261 is configured to receive new contact entries 271 from one or more input interface 206 associated with the electronic device 201. For example, a user of the electronic device 201 may interact with an input interface 206 such as a navigational input device in order to input an instruction to the contact manager 261 to create a new contact entry 271. Such contact entries 271 may, in at least some example embodiments, be stored in a contact data store in the memory of the electronic device 201.

In at least some example embodiments, a contact entry 271 may be received at the contact manager 261 over the network 101 from another device or system. For example, the contact entry 271 may be received via the communication subsystem 211. The contact entry may be received in vCard format or in another format which describes contact information.

In at least some example embodiments, the electronic device 201 may have a notification module 260 stored in memory of the electronic device. The notification module 260 is configured to monitor audio based communications, such as phone calls and, in at least some example embodiments, in-person conversations. The notification module 260 may include a speaker identification system (not shown) which is configured to perform an audio analysis on the monitored audio based communications to identify a contact associated with the monitored communications. In at least some example embodiments, the speaker identification system may identify a speaker using one or more voice signatures 294 (FIG. 2) stored in memory of the electronic device 201. After the speaker is identified as a specific contact, the notification module 260 may provide information associated with that contact on the electronic device 201. For example, in at least some example embodiments, the notification module 260 may display a reminder 292 (FIG. 2) associated with that contact on the display screen 204 of the electronic device 201. The functions and features provided by the notification module 260 will be discussed in greater detail below with reference to FIGS. 3 to 10.

The software applications 225 on the electronic device 201 may also include a range of additional applications, including for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (e.g. the display 204) according to the application.

The software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

A predetermined set of applications that control basic device operations, including data and possibly voice communication applications will normally be installed on the electronic device 201 during or after manufacture. Additional applications and/or upgrades to the operating system 223 or software applications 225 may also be loaded onto the electronic device 201 through the wireless network 101, the auxiliary I/O subsystem 250, the data port 252, the short-range communication subsystem 262, or other suitable subsystem 264. The downloaded programs or code modules may be permanently installed; for example, written into the program memory (i.e. the flash memory 244), or written into and executed from the RAM 246 for execution by the processor 240 at runtime.

Figure 2:
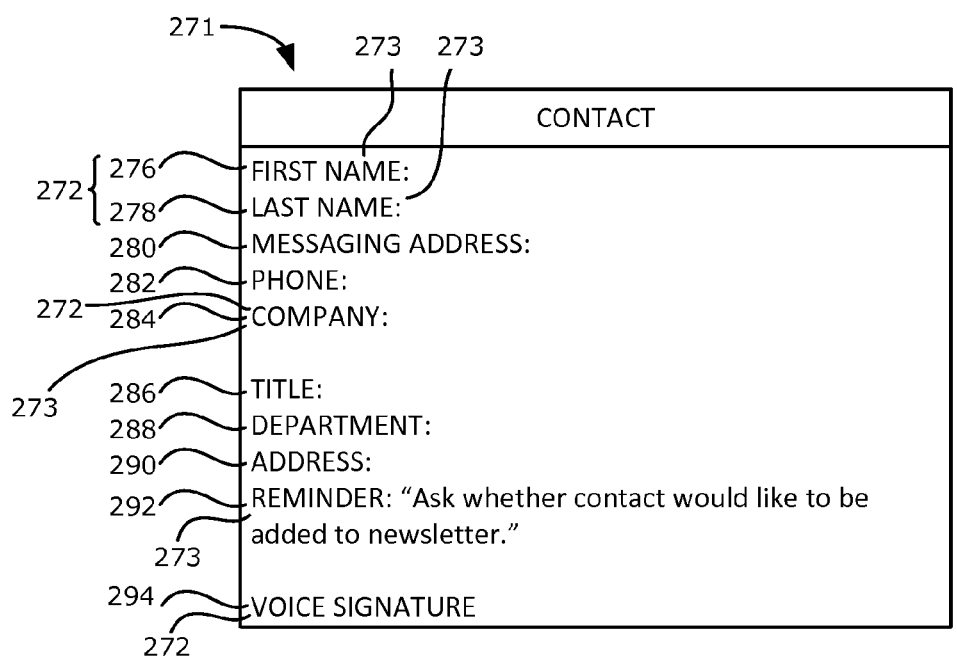
FIG. 2 is a block diagram illustrating an example contact entry in accordance with example embodiments of the present disclosure.

Referring briefly to FIG. 2, an example contact entry 271 is illustrated. The contact entry 271 is associated with a specific contact. The example contact entry 271 includes information which is associated with that contact.

The information associated with the contact (which may be included in the contact entry 271) may include for example, one or more names, such as a first name 276 (which may also be referred to as a given name) and/or a last name 278 (which may also be referred to as a surname). The information associated with the contact may also include one or more messaging address 280 associated with the contact. The messaging addresses 280 are addresses which may be used to send electronic messages to the contact. The messaging addresses 280 may include for example, an email address associated with the contact. The messaging addresses 280 may also include other messaging addresses associated with the contact, such as for example, a text messaging address (such as an Short Messaging Service (SMS) or Multimedia Messaging Service (MMS) based messaging address), an instant messaging address, an device-to-device based messaging address (such as a Personal Identification Number (PIN) based messaging address), a fax number, or other messaging addresses.

The contact entry 271 may also include one or more phone numbers 282 associated with the contact. In at least some example embodiments, the contact entry 271 may specify a plurality of phone numbers 282 associated with the contact. Such phone numbers 282 may include for example, a business phone number, a home phone number, a mobile phone number. Other types of phone numbers are also possible.

The contact entry 271 may also include any one or more of the following fields: a company name 284 for specifying the name of the contact's employer, a job title field 286 for specifying the contact's job title, a department field 288 for specifying the department which the contact is a member of, one or more address fields 290 for specifying a physical address associated with the contact, such as a home address and/or a business address. Other fields may also be included.

At least some of the information associated with the contact may operate as contact identification information 272. The contact identification information 272 is information which may be used to identify a contact when that contact is speaking. That is, the contact identification information 272 includes information that may be used by the electronic device 201 to identify which contact is speaking during an audio based conversation.

For example, the contact identification information 272 may include the one or more name 276, 278 (such as the first name 278 and/or the last name 278). In at least some example embodiments, the contact identification information 272 may also include a company name 284. For example, when speaking a contact may introduce himself as "John Smith from Company X". In such an example, a first name 276 (e.g. John), a last name 278 (e.g. Smith) and a company name 284 (e.g. Company X) are all used as contact identification information 272. That is, when a first name, last name and/or company name are spoken in an audio based conversation, the electronic device may use the first name 276, last name 278 and/or company name 284 to determine the identity of the speaker (i.e. to associate the speaker with the contact entry 271 having the same first name 276, last name 278 and/or company name 284).

In some example embodiments, a speaker recognition analysis may be used to determine whether a contact is a participant in a communication. In such example embodiments, the contact identification information 272 which may be used to identify a contact when that contact is speaking may include a voice signature 294 for the contact. The voice signature 294, in an example embodiment, includes acoustic pattern information which may be used as a biometric in order to perform speaker identification to attempt to recognize a speaker. The acoustic patterns may reflect anatomy, such as the size and shape of the throat and mouth, and/or learned behavioural patterns, such as voice pitch and speaking style, in example embodiments.

The voice signature 294 is, in the example embodiment illustrated, stored in the contact entry 271. The voice signature 294 may be one or more files which are attached or associated with the contact entry 271. However, the voice signature 294 may be stored elsewhere, such as for example on a server in which the electronic device can access through a wireless network. The voice signature 294 is stored in a manner in which it is associated with the contact. For example, in at least some example embodiments, the voice signature 294 may be stored independently of the contact entry 271 but may link to the contact entry 271. Alternatively, in at least some example embodiments, the voice signature 294 may be stored independently of the contact entry 271 but the contact entry 271 may link to the voice signature 294.

Various methods of obtaining a voice signature 294 for a contact will be discussed below with reference to FIGS. 6 to 9.

In at least some example embodiments, the contact entry 271 may be associated with notification information 273. The notification information 273 includes information which the user of the electronic device 201 will be reminded of when they are speaking to the contact defined by the contact entry 271. For example, the notification information 273 may include one or more reminder 292. The reminder 292 may be a note that the user of the electronic device 201 wishes to be reminded about when they speak to the contact. In the example illustrated, the reminder 292 indicates that the user wishes to be reminded to "Ask whether contact would like to be added to newsletter." As will be explained in greater detail below, when a user is engaged in an audio based communication with the contact, the reminder 292 may be triggered so that the user is reminded of the information contained in the reminder 292

The reminder 292 may be created by a user of the electronic device 201. That is, a user of the electronic device 201 may interact with one of the input mechanisms associated with the electronic device 201 to input the reminder 292 to the device 201. The reminder 292 is received at the device 201 and stored in memory of the device 201. In the example embodiment illustrated, the reminder 292 is stored in the contact entry 271. However, the reminder may be stored elsewhere, such as for example on a server in which the electronic device can access through a wireless network. The reminder is, however, stored in a manner in which it is associated with the contact.

The reminder is, in at least some example embodiments, a text-based reminder. However, in other example embodiments, the reminder may be audio, video, or image based.

The notification information 273 may also include other information instead of or in addition to the reminder 292. For example, the notification information 273 may include one or more names (such as a first name 276 and a last name 278) associated with the contact. Similarly, the notification information 273 may also include a company name 273 associated with the contact. In at least some example embodiments (not illustrated), the notification information 273 may include an image associated with the contact, such as a photograph of the contact.

As will be explained in greater detail below, in at least some example embodiments, the electronic device 201 is configured to display the notification information 273 associated with a contact on the display 204 when that contact is a participant in an audio based communication monitored by the electronic device 201. For example, in some example embodiments, when a user is engaged in a phone call with the contact, the notification information 273 for that contact may be displayed on the display 204. Similarly, in some example embodiments, when a user is engaged in an in-person conversation with the contact, the notification information 273 for that contact may be displayed on the display 204.

Providing Information Related to Participants in an Audio Based Communication

In at least some example embodiments, the electronic device 201 may monitor communications on the electronic device and/or communications in the vicinity of the electronic device 201 to identify participants in such communications. When participants are identified, information associated with those participants may be provided on the electronic device 201. For example, a participant may be identified as a contact associated with a contact entry on the electronic device 201 and a reminder associated with that contact entry may be provided on the electronic device 201.

Figure 3:
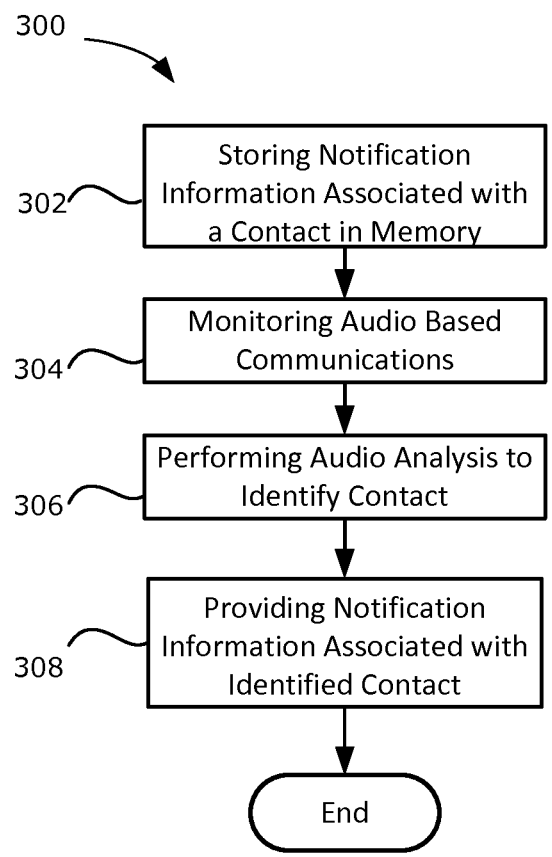
FIG. 3 is a flowchart of a method for facilitating communications using an electronic device is accordance with example embodiments of the present disclosure.

Reference will now be made to FIG. 3 which illustrates a flowchart of a method 300 for facilitating communications using an electronic device 201. The electronic device 201 (FIG. 1) may be configured to perform the method 300 of FIG. 3. In at least some example embodiments, the processor 240 (FIG. 1) of the electronic device 201 (FIG. 1) is configured to perform the method 300. More particularly, in at least some example embodiments, one or more application 225 (FIG. 1) or module stored in memory of the device 201 (FIG. 1) may be configured to perform the method 300 of FIG. 3. One or more applications 225 (FIG. 1) may contain computer readable instructions which cause the processor 240 (FIG. 1) of the electronic device 201 (FIG. 1) to perform the method 300. In at least some example embodiments, the notification module 260 and/or the contact manager 261 (FIG. 1) may be configured to perform the method 300 of FIG. 3. More particularly, the notification module 260 and/or the contact manager 261 may include computer readable instructions which, when executed, cause the processor 240 (FIG. 1) to perform the method 300 of FIG. 3.

The method 300 of FIG. 3 may, in at least some example embodiments, be provided by other software applications or modules apart from those specifically discussed above; for example, the operating system 223 (FIG. 1). Similarly, any portion of the method 300 of FIG. 3 may be performed by or rely on other applications 225 (FIG. 1) or modules which interface with the contact manager 261 and/or the notification module 260 (FIG. 1).

In the method 300 of FIG. 3, at 302, notification information 273 (FIG. 2) related to a contact is stored in memory and is associated, in memory, with that contact. The notification information 273 (FIG. 2) is, in at least some example embodiments, stored by the contact manager 261. The notification information 273 is information which the electronic device 201 is configured to display when the user of the electronic device 201 is engaged in a conversation with the contact associated with the notification information 273 (FIG. 2). The notification information 273 (FIG. 2) may be information which a user of the electronic device 201 may wish to be presented to the user when the user is speaking to the contact.

In some example embodiments, the notification information 273 (FIG. 2) associated with the contact may include the name of the contact (such as for example, the first name 276 (FIG. 2) and/or last name 278 (FIG. 2)). Such information may be useful to a user who has difficulty remembering the identity of the contact. In at least some example embodiments (not shown), the notification information 273 (FIG. 2) may include an image associated with the contact, such as a photograph depicting the contact.

In at least some example embodiments, the notification information 273 (FIG. 2) related to the contact which is stored at 302 may include a reminder 292 (FIG. 2) associated with the contact. The reminder 292 (FIG. 2) may specify information which the user of the electronic device 201 wishes to be reminded of when they next speak with the contact. For example, the reminder 292 may specify a question which the user of the electronic device 201 (FIG. 1) wishes to ask of the contact. Other types of reminders are also possible.

The notification information 273 related to the contact is, in at least some example embodiments, stored in one or more datastores in a memory of the electronic device 201. The datastore associates the notification information 273 (FIG. 2) related to the contact with corresponding contact identification information 272 (FIG. 2) for that contact. As noted previously, the contact identification information 272 (FIG. 2) is information which may be used by the electronic device 201 to identify a contact as a participant in an audio based communication. For example, the contact identification information 272 may include a first name 276, a last name 278, and/or a company name 284. The contact identification information 272 may also include a voice signature 294 associated with the contact.

In at least some example embodiments, the notification information 273 related to the contact may be stored in a contact entry 271 (FIG. 2) in memory of the electronic device 201.

At 304, the notification module 260 (FIG. 1) monitors audio based communications. The audio based communications which are monitored include, in at least some example embodiments, audio based communications which take place over a communication subsystem 211 (FIG. 1) associated with the electronic device 201 (FIG. 1). For example, in at least some example embodiments, the monitored communications include phone calls made with the electronic device 201.

In at least some example embodiments, the audio based communications which are monitored include local conversations. Local conversations are conversations which are in the acoustic vicinity of the electronic device 201 (FIG. 1). That is, the local conversations are in-person conversations which are audible at the electronic device 201 (FIG. 1). The audio based communications are, in at least some example embodiments, monitored using the microphone 258 (FIG. 1) on the electronic device 201. The microphone 258 (FIG. 1) which is used to monitor the audio based communications may be the same microphone which is used by the electronic device 201 for phone calls. In at least some example embodiments, the microphone 258 (FIG. 1) which is used to monitor the audio based communications may also be used for audio input for speakerphone based communications on the electronic device 201 (FIG. 1).

At 306, an audio analysis is performed on the monitored communications to identify a contact associated with the monitored communications. The audio analysis may, in at least some example embodiments, use contact identification information 272 (FIG. 2) to determine whether a contact is a participant in the monitored communications. Various methods of identifying a contact in the monitored communications will be discussed in greater detail below with reference to FIGS. 5 to 10.

After a participant in the audio based communication is identified as a contact, at 308, notification information 273 (FIG. 2) associated with the identified contact is provided on the electronic device 201 (FIG. 1). The notification information 273 (FIG. 2) associated with the identified contact may be the notification information (or a portion of the information) stored at 302.

The notification information may be information which a user of the electronic device 201 previously indicated that they would like to be reminded of when the user is speaking to the contact. For example, in at least some example embodiments, the notification information 273 provided at 308 may include a reminder 292 (FIG. 2) associated with the contact.

Accordingly, in at least some example embodiments, in response to determining that a contact associated with a reminder is a party to the monitored communications, the reminder associated with that contact is triggered. More particularly, in some example embodiments, after identifying a contact associated with the monitored communications (at 306) and prior to providing the information associated with the identified contact (at 308), the notification module 260 may determine whether the identified contact is associated with a reminder. In response to determining that the identified contact is associated with a reminder 292, that reminder 292 may be displayed (at 308) on the display. That is, 308 (providing the notification information associated with the identified contact) may occur in response to determining that the identified contact is associated with the reminder.

In some example embodiments, if it is determined that the identified contact is not associated with any reminders, then the notification information associated with the identified contact may not be provided on the display (i.e. 308 may be omitted). That is, in at least some example embodiments, if it is determined that the identified contact is not associated with a reminder, then notification information associated with the identified contact is not provided on the electronic device 201 (FIG. 1) at 308. In other example embodiments, if the identified contact is not associated with a reminder, other notification information 273 (such as a first name 276, last name 278, company name 284 and/or image (such as a photograph)) may be provided on the display 204 (FIG. 1).

In some example embodiments, the notification information 273 (FIG. 1) which is provided at 308 may include the name of the identified contact (such as for example, a first name 276 (FIG. 2) and/or last name 278 (FIG. 2)). Similarly, in at least some example embodiments, the notification information which is provided at 308 may include the company name 284 (FIGS. 2 & 4) associated with the identified contact. The notification information 273 which is provided at 308 may also include an image associated with the identified contact, such as a photograph depicting the identified contact.

In at least some example embodiments, at 308, the notification information 273 associated with the identified contact may be provided on a display 204 (FIG. 1) associated with the electronic device 201 (FIG. 1). That is, the notification information 273 may be displayed in a notification screen 400 (FIG. 4) on the display 204 (FIG. 1). An example notification screen 400 will be discussed in greater detail below with reference to FIG. 4.

In at least some example embodiments, to alert a user to the notification information 273 (FIG. 2) displayed on the display 204 (FIG. 1), an alert may be generated on the electronic device 201. The alert may be generated on the electronic device 201 contemporaneously with the display of the notification information 273 (FIG. 2) on the display 204 (FIG. 1). The alert is, in at least some example embodiments, a vibratory notification which is provided by a vibrator associated with the electronic device 201 (FIG. 1). In other example embodiments, an audible notification may be provided by a speaker 256 (FIG. 1) associated with the electronic device 201 (FIG. 1). Similarly, in other example embodiments, an optical notification may be provided by a light associated with the device, such as an light emitting diode (LED) associated with the electronic device 201 (FIG. 1).

The notification information 273 (FIG. 2) may, in at least some example embodiments, be presented using an output interface 205 (FIG. 1) on the electronic device 201 (FIG. 1) instead of or in addition to the display 204 (FIG. 1). For example, in some example embodiments, the reminder may be presented as an audio based reminder through the speaker 256.

The method 300 may be modified in some example embodiments. For example, in some example embodiments (not illustrated), the notification information 273, such as a reminder, may only be displayed if it is determined that one or more conditions is satisfied. The conditions may be previously set by a user of the device 201. For example, a user may specify a condition at 302 which is associated with the notification information 273 and which must be satisfied before the notification information is displayed at 308. In such example embodiments, the method 300 may include receiving, via an input interface 206 (FIG. 1), conditional information which specifies a condition associated with the notification information 273. Then, the method 300 may include, prior to displaying the notification information 273, determining whether a condition specified by the conditional information is satisfied. If it is determined that the condition is satisfied, then the method 300 may proceed to 308 where the notification information 273 is displayed. If the condition is not satisfied, then the display of the notification information may be suppressed (i.e. not displayed).

For example, in some example embodiments, a user may specify that the notification information (such as a reminder) is only to be displayed during specified times. By way of example, a user may specify that the notification information should only be displayed if the time of day of a communication is before a predetermined time. This would allow a user to trigger a notification if they are in a communication with a person during the day but suppress the notification if they are in a communication with a person during the evening. In such example embodiments, the method may include receiving, via an input interface 206 (FIG. 1), timing information which specifies a time during which notification information 273 may be displayed. Then, the method 300 may include, prior to displaying the notification information 273 (at 308), determining whether the time of the communication is within the time specified by the timing information. If the time is within the time specified by the timing information, the method 300 may proceed to 308 where the notification information 273 is displayed. If, however, the time of the communication is not within the time specified by the timing information, then the display of the notification information may be suppressed (i.e. not displayed).

Similarly, in at least some example embodiments, a user may specify one or more black-out period associated with notification information, such as a reminder. A black-out period is a period of time where a user does not want notification information 273 to be displayed. For example, a user may not want notification information, such as a reminder, to be displayed during a specific meeting with a contact. For example, a user may not want a reminder regarding a recent vacation to be displayed when a user is engaged in an important meeting with the contact. Accordingly, in at least some example embodiments, the method 300 may include receiving, via an input interface 206 (FIG. 1) black-out information associated with notification information 273. The black-out information may specify one or more black-out periods during which the user does not want the notification information 273 to be displayed. In such example embodiments, the method 300 may also include, prior to displaying the notification information (at 308), determining whether the time of the communication is within a blackout period specified by the black-out information. If the time is within the black-out period specified by the black-out information, then the display of the notification information may be suppressed (i.e. not displayed). If, however, the time is not within the black-out period, then the method 300 may proceed to 308 where the notification information 273 is displayed.

Similarly, in at least some example embodiments, a user may specify a type of audio based communication associated with the notification information 273. That is, a user may specify that the notification information 273 is only to be displayed when the user is engaged in a certain type of audio based communication with the contact. For example, in some example embodiments, a user may specify whether the notification information 273 is to be displayed only when the user is engaged in a phone call with the contact. Similarly, a user may specify whether the notification information 273 is to be displayed only when the user is engaged in a local conversation with the contact. In such example embodiments, the method 300 may include receiving, via an input interface 206 (FIG. 1), communication type information which specifies one or more communication types associated with the notification information 273. The method 300 may also include, prior to displaying the notification information (at 308), determining whether a type of the communication corresponds to a type associated with the communication type information associated with the notification information 273. If the type of the communication which the user is currently engaged in corresponds to the type associated with the communication type information, then at 308, the notification information 273 is displayed (i.e. if the user is engaged in a local conversation and the user specified that the notification information 273 should be displayed during a local conversation, then the notification information 273 is displayed). If, however, the type of the communication which the user is currently engaged in does not correspond to the type associated with the communication type information, then the notification information is suppressed (i.e. not displayed)

Similarly, in at least some example embodiments, a user may specify whether notification information, such as a reminder, is to be displayed when a user is engaged in a public communication. A public communication may be defined as a communication which includes participants in addition to the user of the device and the contact. That is, a public communication includes more than two people. This may be contrasted with a private communication which may be defined as a communication which includes only the user and the contact. In some cases, a user may wish to be reminded of something when that user is only speaking with a contact and no third parties are included in the communication. Accordingly, in some example embodiments, the method 300 may include receiving, via an input interface 206 (FIG. 1), a private communication indicator which indicates whether the notification information 273 is only to be displayed when the user is engaged in a private communication. In such example embodiments, if the private communication indicator specifies that the notification information 273 is only to be displayed when the user is engaged in a private communication, the method may include determining whether the user is engaged in a private communication. If the user is not engaged in a private communication and the private communication indicator specifies that the notification information 273 is only to be displayed when the user is engaged in a private communication, then the notification information may be suppressed (i.e. not displayed). If, however, the user is engaged in a private communication, then the notification information may be displayed at 308.

Example Notification Screen

Figure 4:
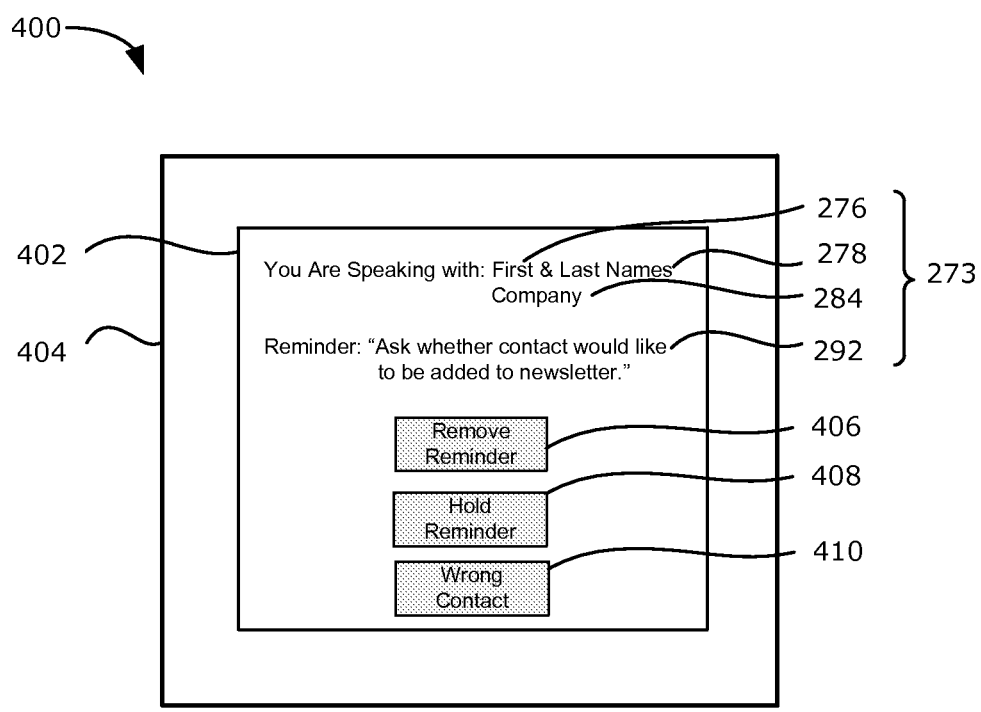
FIG. 4 is a block diagram illustrating a notification screen in accordance with example embodiments of the present disclosure.

Referring now to FIG. 4, an example notification screen 400 is illustrated. The notification screen 400 displays notification information 273 associated with the identified contact 412.

In the example embodiment illustrated, the notification information 273 includes a name (which, in the illustrated example embodiment includes a first name 276 and a last name 278) and a company 284 associated with the contact.

In the example embodiment illustrated in FIG. 4, the notification information 273 associated with the identified contact which is displayed on the display 204 (FIG. 1) includes the reminder 292 associated with the contact. By way of example, in the notification screen 400 of FIG. 4, the reminder 292 states: "Ask whether contact would like to be added to newsletter."

Other information associated with the contact may also be displayed in the notification screen 400. For example, in at least some example embodiments (not shown), an image associated with the identified contact (such as a photograph depicting the contact) may be included in the notification screen 400.

In some example embodiments, the notification screen 400 may display the complete contact entry 271 (FIG. 2) associated with the contact. That is, after a participant in a communication is identified as a contact, the contact entry 271 for that contact may be displayed.

In the example embodiment illustrated, the notification information 273 associated with the identified contact is displayed in a pop-up window 402, which is overlaid on a main window 404 of the display 204 (FIG. 1). However, in other example embodiments, the notification information 273 associated with the contact may not be displayed in a pop-up window 402. Instead, the notification information 273 associated with the contact may be displayed in a main window 404 which may occupy all of the viewing area of the display 204.

The notification screen 400 may include one or more selectable interface elements 406, 408, 410 for inputting commands related to the notification to the electronic device 201. In the example illustrated, the selectable interface elements 406, 408, 410 are command buttons. Other types of selectable interface elements may also be used.

In the example embodiment of FIG. 4, the notification screen 400 includes a selectable interface element 406 for dismissing the notification. In the example embodiment, this selectable interface element 406 is labelled "Remove Reminder".

In at least some example embodiments, when the selectable interface element 406 for dismissing the notification is selected (for example, when a user engages the interface element 406 with an input interface 206 (FIG. 1) of the electronic device 201 (FIG. 1)), the notification screen 400 is removed from the display 204. In at least some example embodiments, when the notification screen 400 is removed from the display 204 (FIG. 1), the display 204 returns to a display state which existed prior to the display of the notification screen 400. For example, the electronic device 201 may resume display of a screen which was displayed on the display 204 (FIG. 1) before the notification screen 400 was displayed.

The selectable interface element 406 for dismissing the notification may be used by a user to input a command to the electronic device 201 to indicate that the user does not wish to be reminded of the reminder 292 in future communications with the contact. In response to receiving a selection of the selectable interface element 406 for dismissing the notification, the notification module 260 may remove at least a portion of the notification information 273 from the contact entry 271 (FIG. 1) (or wherever else it is stored), or flag such information 412 as dismissed. For example, the reminder 292 may be removed from the contact entry 271 or flagged as dismissed so that the notification module 260 does not cause the reminder 292 to be re-displayed on the display 204 the next time that the device detects a communication with the same contact.

In the example embodiment of FIG. 4, the notification screen 400 also includes a selectable interface element 408 for holding the notification in abeyance until the next communication with the contact. In the example embodiment, this selectable interface element 408 is labelled "Hold Reminder". In at least some example embodiments, when the selectable interface element 408 for holding the notification is selected (for example, when a user engages the interface element 408 with an input interface 206 (FIG. 1) of the electronic device 201 (FIG. 1)), the notification screen 400 is removed from the display 204. In at least some example embodiments, when the notification screen 400 is removed from the display 204 (FIG. 1), the display 204 (FIG. 1) returns to a display state which existed prior to the display of the notification screen 400. For example, the display 204 resumes display of the display screen which was displayed before the notification screen 400 was displayed.

The selectable interface element 408 for holding the notification may be used to input a command to the electronic device 201 to indicate that the user would like to be reminded of the reminder 292 in future communications with the contact. In response to receiving a selection of the selectable interface element 408 for holding the notification, the notification module 260 may retain the reminder 292 in the contact entry 271 (or wherever else it is stored), so that it may be re-displayed during the next audio based communication with that contact.

In the example embodiment of FIG. 4, the notification screen 400 also includes a selectable interface element 410 for inputting a command to the electronic device 201 to indicate that the contact associated with the notification screen 400 (which is the contact identified at 306 of FIG. 3) is not a participant in the monitored audio based communication. In the example embodiment illustrated this selectable interface element 410 is labelled "wrong contact". The selectable interface element 410 for indicating to the electronic device 201 that the contact associated with the notification screen 400 is not a participant may be used by a user to indicate to the electronic device 201 that an error has occurred in the identification process. That is, the user may use the selectable interface element 410 to advise the electronic device 201 that it has misidentified a participant in the audio based communication.

In response to receiving a selecting of the selectable interface element 410, the notification module 260 may attempt to re-identify the participants in the conversation. That is, the method 300 of FIG. 3 may resume monitoring the audio based communications (at 304) to attempt to identify participants at 306. During this pass of identification, the notification module 260 may be configured to exclude, from the identification process, the contact which was previously identified in the analysis. That is, the notification module 260 may be prevented from re-selecting the contact which the user indicated was not a participant in the communication.

Speaker Identification Analysis

In at least some example embodiments, a speaker identification analysis may be performed in order to identify one or more participants in an audio based communication so that notification information 273 (FIG. 2) related to those participants may be provided.

Figure 5:
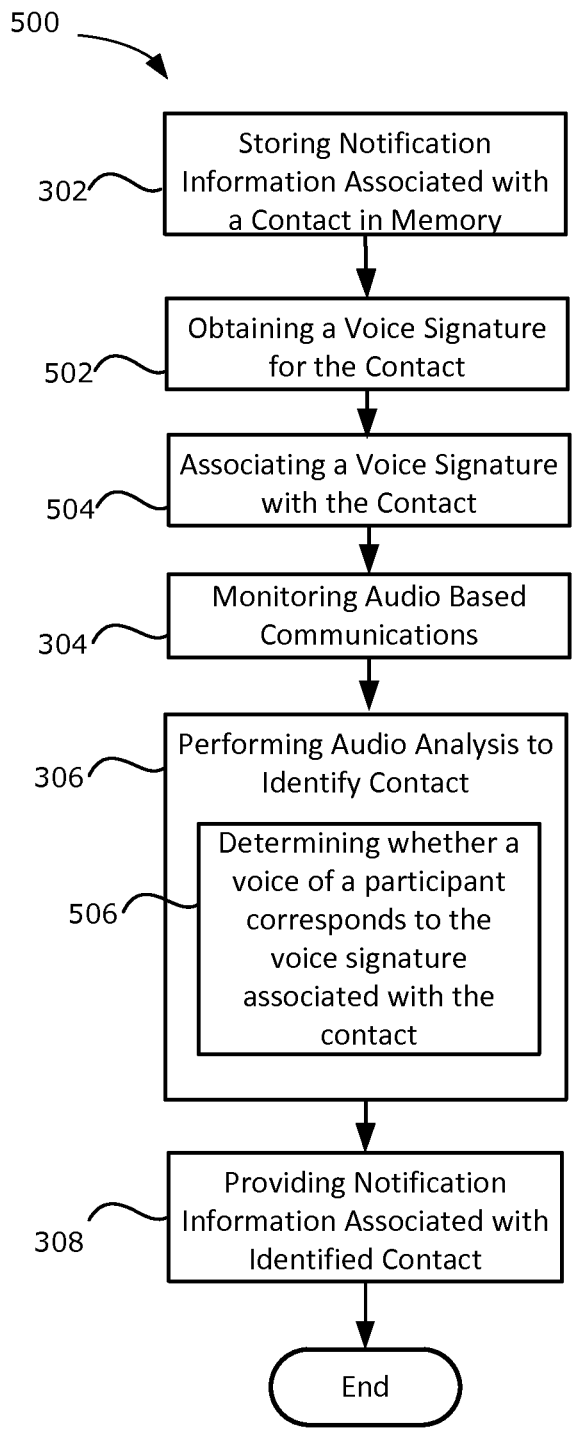
FIG. 5 is a flowchart of a method for facilitating communications using an electronic device in accordance with example embodiments of the present disclosure.

Referring now to FIG. 5, one such example embodiment is illustrated. FIG. 5 illustrates a flowchart of a method 500 for facilitating communications using an electronic device 201. More particularly, FIG. 5 illustrates a flowchart of a method 500 for triggering a notification on an electronic device 201 based on a speaker identification analysis.

The electronic device 201 (FIG. 1) may be configured to perform the method 500 of FIG. 5. In at least some example embodiments, the processor 240 (FIG. 1) of the electronic device 201 (FIG. 1) is configured to perform the method 500. More particularly, in at least some example embodiments, one or more application 225 (FIG. 1) or module stored in memory of the device 201 (FIG. 1) may be configured to perform the method 500 of FIG. 5. One or more applications 225 (FIG. 1) may contain computer readable instructions which cause the processor 240 (FIG. 1) of the electronic device 201 (FIG. 1) to perform the method 500. In at least some example embodiments, the notification module 260 and/or the contact manager 261 (FIG. 1) may be configured to perform the method 500 of FIG. 5. More particularly, the notification module 260 and/or the contact manager 261 may include computer readable instructions which, when executed, cause the processor 240 (FIG. 1) to perform the method 500 of FIG. 5.

The method 500 of FIG. 5 may, in at least some example embodiments, be provided by other software applications or modules apart from those specifically discussed above; for example, the operating system 223 (FIG. 1). Similarly, any portion of the method 500 of FIG. 5 may be performed by or rely on other applications 225 (FIG. 1) or modules which interface with the contact manager 261 and/or the notification module 260 (FIG. 1).

First, at 302, notification information 273 (FIG. 2) related to a contact is stored in memory and is associated, in memory, with that contact. 302 is discussed in greater detail above with reference to FIG. 3.

At 502, the notification module 260 obtains a voice signature 294 (FIG. 2) for the contact associated with the notification information 273 (FIG. 2) of 302. The voice signature 294, in an example embodiment, includes acoustic pattern information which may be used as a biometric in order to perform speaker identification to attempt to recognize a speaker. The acoustic patterns may reflect anatomy, such as the size and shape of the throat and mouth of the contact, and/or learned behavioural patterns, such as voice pitch and speaking style, in example embodiments. Various methods of obtaining a voice signature 294 (FIG. 2) will be discussed in greater detail below with reference to FIGS. 6 to 9.

At 504, the voice signature 294 obtained at 502 is associated with the contact in memory. More particularly, the voice signature 294 is stored in memory and an association is created between the notification information 273 (FIG. 2) received at 302 and the voice signature 294. In at least some example embodiments, the voice signature may be stored in the contact entry 271 for its associated contact. The voice signature 294 may be one or more files which are attached or associated with the contact entry 271. However, in other example embodiments, the voice signature 294 may be stored elsewhere, such as for example on a server in which the electronic device can access through a wireless network. The voice signature 294 is stored in a manner in which it is associated with the contact or associated with notification information 273 which is associated with the same contact (i.e. the voice signature 294 is associated, in memory, with notification information 273). For example, in at least some example embodiments, the voice signature 294 may be stored independently of the contact entry 271 but may link to the contact entry 271. Alternatively, in at least some example embodiments, the voice signature 294 may be stored independently of the contact entry 271 but the contact entry 271 may link to the voice signature 294.

At 304, the notification module 260 monitors audio based communications. 304 is discussed in greater detail above with reference to FIG. 3.

At 306, an audio analysis is performed on the monitored communications to identify a contact associated with the monitored communications. Performing an audio analysis on the monitored communication may include, at 506, performing a voice identification analysis on the monitored audio based communications to determine whether a voice of a participant in the monitored communications corresponds to a voice signature 294 (FIG. 2) associated with a contact. That is, the notification module 260 determines whether a voice of a participant in the monitored communication matches any voice signatures associated with any contacts.

In at least some example embodiments, prior to performing the audio analysis at 306, a user of the electronic device 201 may store a voice signature for the user on the electronic device 201. In such example embodiments, during the step 306 of performing the audio analysis, the portions of the monitored communication that are associated with the voice signature of the user may be filtered out. That is, the notification module 260 may be configured to ignore the portion of the audio based communications containing the user's voice.

At 308, after a participant in the audio based communication is identified as a contact, notification information 273 (FIG. 2) associated with the identified contact is provided on the electronic device 201 (FIG. 1). The notification information 273 (FIG. 2) associated with the identified contact may be the notification information (or a portion of the information) stored at 302. 308 is discussed in greater detail above with reference to FIG. 3.

Example Methods for Obtaining a Voice Signature for a Contact

As discussed above with reference to FIG. 5, at least some example embodiments use voice signatures 294 to identify participants in audio based communications. The following discusses example methods 600, 700, 800, 900 for obtaining a voice signature 294 (FIG. 2) for a contact.

Any one or a combination of the methods 600, 700, 800, 900 for obtaining a voice signature discussed below with reference to FIGS. 6 to 9 may be used at 502 and/or 504 of FIG. 5 to obtain a voice signature for a contact and associate that voice signature with a contact.

Figure 6:
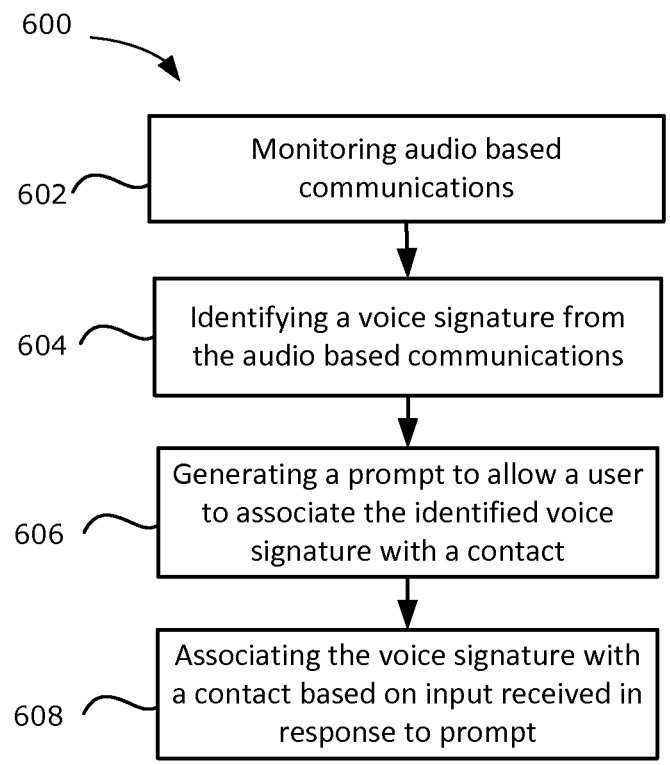
FIG. 6 is a flowchart of a method for obtaining a voice signature and associating that voice signature with a contact in accordance with example embodiments of the present disclosure.

Referring first to FIG. 6, a flowchart of a method 600 for obtaining a voice signature and associating that voice signature with a contact is illustrated. In the method 600 of FIG. 6, user input is used to facilitate the process of obtaining and associating the voice signature.

First, at 602, audio based communications are monitored. The audio based communications which are monitored include, in at least some example embodiments, audio based communications which take place over a communication subsystem 211 (FIG. 1) associated with the electronic device 201 (FIG. 1). For example, in at least some example embodiments, the monitored communications include phone calls on the electronic device 201.

In at least some example embodiments, the audio based communications which are monitored include local conversations. Local conversations are conversations which are in the acoustic vicinity of the electronic device 201 (FIG. 1). That is, the local conversations are in-person conversations which are audible at the electronic device 201 (FIG. 1). The audio based communications are, in at least some example embodiments, monitored using the microphone 258 (FIG. 1) on the electronic device 201. The microphone 258 (FIG. 1) which is used to monitor the audio based communications may be the same microphone which is used by the electronic device 201 for phone calls. In at least some example embodiments, the microphone 258 (FIG. 1) which is used to monitor the audio based communications may also be used for audio input for speakerphone based communications on the electronic device 201 (FIG. 1).

In at least some example embodiments, at 602, audio based communications are monitored and any parties who do not have a voice signature stored on the device 201 are identified. Any parties who already have a voice signature may be ignored.

At 604, one or more voice signatures 294 may be identified from the audio based communications. The one or more voice signatures 294 each correspond to a voice in the audio based communication. The voice signature 294 may be identified or generated using one or more of the following technologies: frequency estimation, hidden Markov models, Gaussian mixture models, pattern matching algorithms, neural networks, matrix representation, vector quantization and decision trees. Other technologies may also be used.

At 606, a prompt may be generated on the device 201 to permit the user of the electronic device to associate the identified voice signature with a contact. The prompt may be for example, a visual prompt displayed on the display 204 (FIG. 1). For example, the prompt may ask the user to select or add a contact who was a participant in the conversation. A user may respond to the prompt for example by interacting with an input interface 206 associated with the electronic device 201 to select or add contact information for the contact associated with the voice signature.

The prompt, at 606, may not be generated during the audio communication which is monitored at 606. To avoid interrupting the communication, the prompt may be generated later, when the communication has ceased. In such example embodiments, during the audio based communication, any unknown voices may be tagged and a portion of the audio based communication which includes that voice may be recorded (at 602) and may be played back for a user during 606.

At 608, in response to receiving a selection of a contact or an addition of a contact, the electronic device 201 (FIG. 1) may associate the voice signature with that contact. For example, the voice signature may be added or a link to the voice signature may be added to a contact entry 271 (FIG. 2) associated with that contact.

Figure 7:
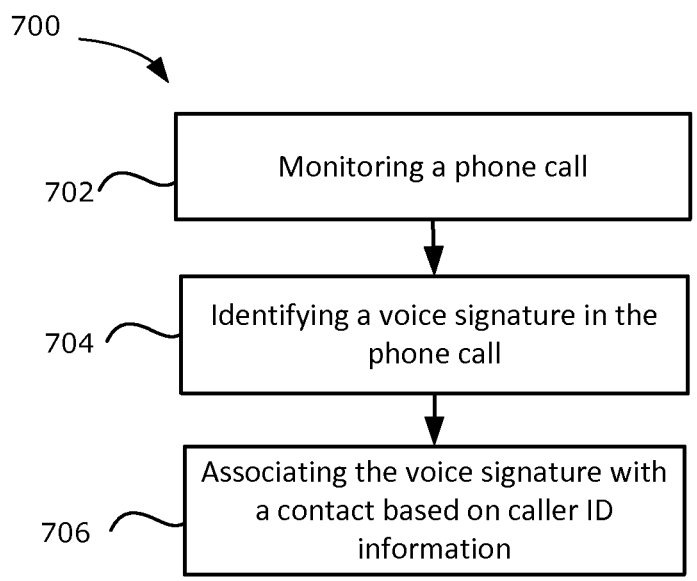
FIG. 7 is a flowchart of a method for obtaining a voice signature and associating that voice signature with a contact in accordance with example embodiments of the present disclosure.

Referring now to FIG. 7, a flowchart of a further method 700 for obtaining a voice signature and associating that voice signature with a contact is illustrated. In the method 700 of FIG. 7, caller identification information may be used to associate the voice signature with a contact.

First, at 702, a phone call on the electronic device 201 is monitored.

At 704, one or more voice signatures 294 may be identified from the phone call. The one or more voice signatures 294 each correspond to a voice in the phone call. The voice signature 294 may be identified or generated using one or more of the following technologies: frequency estimation, hidden Markov models, Gaussian mixture models, pattern matching algorithms, neural networks, matrix representation, vector quantization and decision trees. Other technologies may also be used.

At 706, caller identification information associated with the phone call may be used to associate the voice signature identified at 704 with a contact. Caller identification is a telephone service which transmits a caller's number to a called party's telephone. The caller identification information may be cross referenced with information in contact entries 271 (FIG. 2) stored on the electronic device 201 to determine whether the phone number associated with the phone call is related to an existing contact entry 271. Where the phone number is related to a contact entry 271, the voice signature 294 may be associated with the contact defined by that contact entry. In at least some example embodiments, a prompt may be used to request that a user confirm the identity of the speaker associated with the voice signature.

Figure 8:
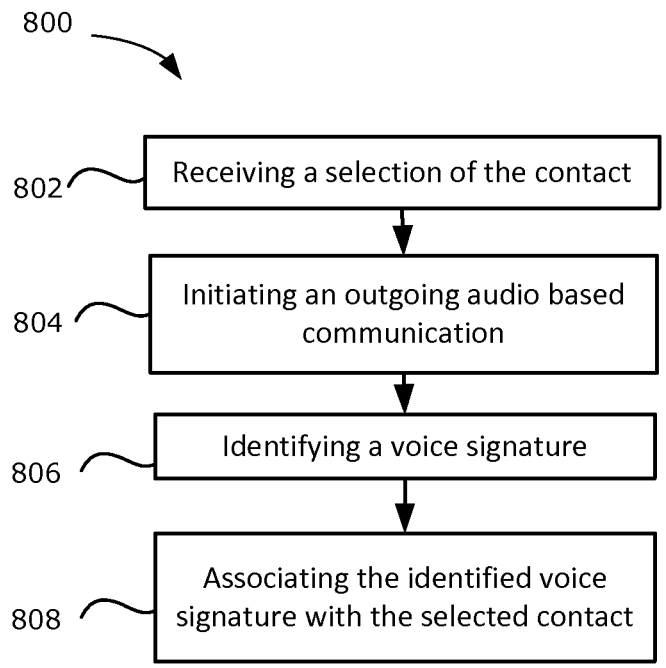
FIG. 8 is a flowchart of a method for obtaining a voice signature and associating that voice signature with a contact in accordance with example embodiments of the present disclosure.

Referring now to FIG. 8, a flowchart of a further method 800 for obtaining a voice signature and associating that voice signature with a contact is illustrated.

In the method 800 of FIG. 8, at 802 a contact is selected to initiate an outgoing audio based communication (such as a phone call) to that contact. For example, a contact may be selected and an option to call the contact may be selected by a user of the electronic device 201 via an input interface 206 associated with the device 201.

At 804, an outgoing audio based communication is initiated to the selected contact. In at least some example embodiments, the outgoing audio based communication is a phone call.

At 806, one or more voice signatures 294 may be identified from the outgoing audio based communication. The one or more voice signatures 294 each correspond to a voice in the outgoing audio based communication. The voice signature 294 may be identified or generated using one or more of the following technologies: frequency estimation, hidden Markov models, Gaussian mixture models, pattern matching algorithms, neural networks, matrix representation, vector quantization and decision trees. Other technologies may also be used.

At 808, the voice signature is associated, in memory, with the contact selected at 802. For example, the voice signature may be added or a link to the voice signature may be added to a contact entry 271 (FIG. 2) associated with the contact selected at 802.

In the methods of FIGS. 6 to 8, when identifying a voice signature at 604 (FIG. 6), 704 (FIG. 7) or 806 (FIG. 8), the portions of the monitored communications that are associated with a voice signature of the user may be filtered out. That is, the notification module 260 may be configured to ignore the portion of the audio based communications containing the user's voice. In such example embodiments, prior to identifying the voice signature in the communication, a user of the electronic device 201 may store their own voice signature on the electronic device 201 so that their voice signature may be used for such filtering.

Figure 9:
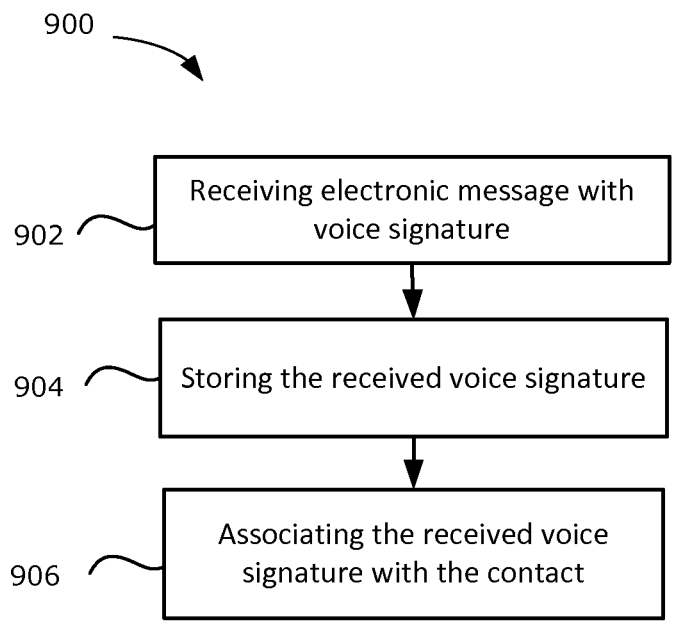
FIG. 9 is a flowchart of a method for obtaining a voice signature and associating that voice signature with a contact in accordance with example embodiments of the present disclosure.

Referring now to FIG. 9, a flowchart of a further method 900 for obtaining a voice signature and associating that voice signature with a contact is illustrated.

In the example embodiment of FIG. 9, the voice signature is received electronically. More particularly, at 902, the voice signature 294 is received in an electronic message from a contact. The voice signature 294 is, in at least some example embodiments, received as an attachment to an electronic message such as an email message. For example, the attachment may be a vCard, or another suitable attachment for storing contact information and/or voice signatures.

At 904, the received voice signature is stored in memory of the electronic device 201 and, at 906 is associated with a contact. In some example embodiments, the received voice signature is associated with the contact from which the electronic message was received. For example, the messaging address used to send the electronic message may be cross referenced with information in contact entries 271 (FIG. 2) stored on the electronic device 201 to determine whether the messaging address is related to an existing contact entry 271. Where the messaging address is related to a contact entry 271, the voice signature may be associated with the contact defined by that contact entry 271. In at least some example embodiments, a prompt may be used to require a user to confirm the identity of the contact which is to be associated with the voice signature 294.

In other example embodiments (not shown) a voice sample may be received electronically. For example, a voice sample may be included in an electronic message from a contact. The voice sample may be in a format which permits a voice signature to be easily generated. For example, the voice sample may recite predetermined text such as a predetermined series of sentences. A voice signature may then be determined from the voice sample. The voice signature may be associated with the contact from which the electronic message was received.

Example Speech Recognition Analysis

In at least some example embodiments, a speech recognition analysis may be performed in order to identify one or more participants in an audio based communication.

Figure 10:
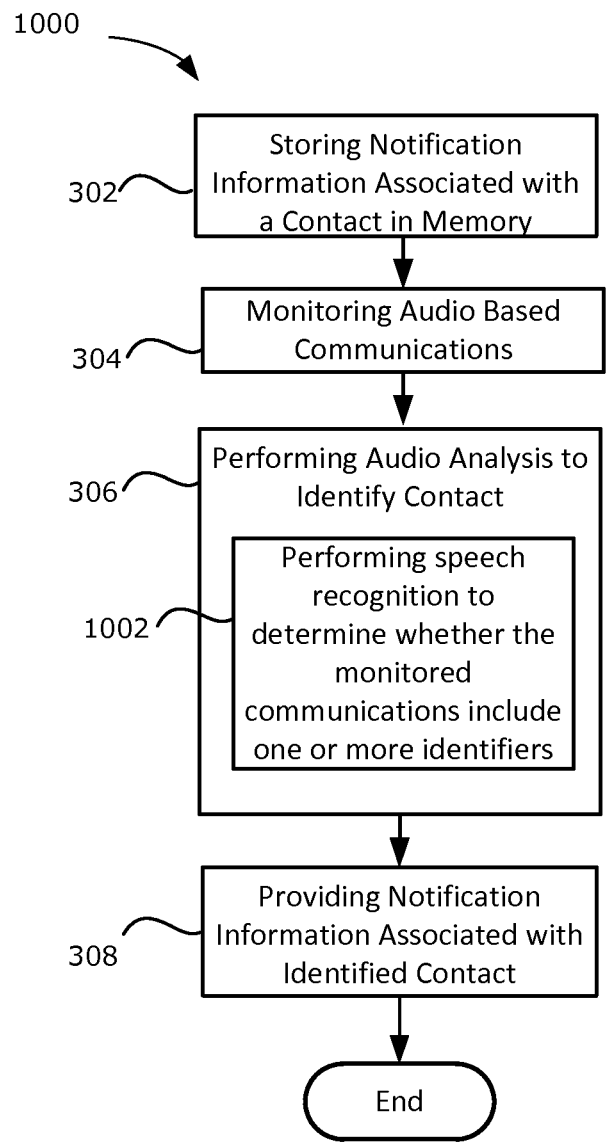
FIG. 10 is a flowchart of a method for facilitating communications using an electronic device in accordance with example embodiments of the present disclosure.

Referring now to FIG. 10, a flowchart is illustrated of a method 1000 for facilitating communications using an electronic device 201. More particularly, FIG. 10 illustrates a flowchart of a method 1000 for triggering a notification on an electronic device 201 based on a speech recognition analysis.

The electronic device 201 (FIG. 1) may be configured to perform the method 1000 of FIG. 10. In at least some example embodiments, the processor 240 (FIG. 1) of the electronic device 201 (FIG. 1) is configured to perform the method 1000. More particularly, in at least some example embodiments, one or more application 225 (FIG. 1) or module stored in memory of the device 201 (FIG. 1) may be configured to perform the method 1000 of FIG. 10. One or more applications 225 (FIG. 1) may contain computer readable instructions which cause the processor 240 (FIG. 1) of the electronic device 201 (FIG. 1) to perform the method 1000. In at least some example embodiments, the notification module 260 and/or the contact manager 261 (FIG. 1) may be configured to perform the method 1000 of FIG. 10. More particularly, the notification module 260 and/or the contact manager 261 may include computer readable instructions which, when executed, cause the processor 240 (FIG. 1) to perform the method 1000 of FIG. 10.

The method 1000 of FIG. 10 may, in at least some example embodiments, be provided by other software applications or modules apart from those specifically discussed above; for example, the operating system 223 (FIG. 1). Similarly, any portion of the method 1000 of FIG. 10 may be performed by or rely on other applications 225 (FIG. 1) or modules which interface with the contact manager 261 and/or the notification module 260 (FIG. 1).

First, at 302, notification information 273 (FIG. 2) related to a contact is stored in memory and is associated, in memory, with that contact. 302 is discussed in greater detail above with reference to FIG. 3.

At 304, the notification module 260 (FIG. 1) monitors audio based communications. 304 is discussed in greater detail above with reference to FIG. 3.

At 306, an audio analysis is performed on the monitored communications to identify a contact associated with the monitored communications. In the example embodiment of FIG. 10, performing an audio analysis on the monitored communications includes, at 1002, performing a speech recognition analysis on the monitored audio based communications to determine whether the monitored communications include one or more identifiers associated with a contact. For example, in at least some example embodiments, the speech recognition analysis determines whether the monitored communications specify one or more names associated with the contact (such as a first name 276 (FIG. 2) and/or last name 278 (FIG. 2)). In at least some example embodiments, the speech recognition analysis determines whether the monitored communications specify a company name 284 associated with the contact.

Where identifiers associated with a contact (such as a name or company name) are included in the audio based communications, they may be used to determine that a contact is a participant in the audio based communications. Such a determination may be made according to one or more predetermined rules. For example, in some example embodiments, a contact may be determined to be a participant in a communication if the contact's first name 276 and last name 278 are mentioned in the communication.

In some example embodiments, a contact may be determined to be a participant in a communication if the contact's first name 276 is mentioned in the communication and if there are no other contacts with that first name 276 that have a contact entry 271 on the electronic device 201.

In some example embodiments, the notification module 260 may determine whether a name associated with a contact is spoken in the communication within a predetermined time from the start of the communication. If this criterion is satisfied, then the notification module 260 may determine that the contact associated with the name is a participant in the communication. Such an example embodiment relies on the fact that participants in a conversation generally introduce themselves at or near the beginning of the conversation.

In some example embodiments, the notification module 260 may determine whether the monitored communications include one or more predetermined introductory terms or phrases within a predetermined proximity to the one or more names. An introductory term or phrase is a term or phrase which is often coupled with a name when a person is introducing themself. For example, in the phrase "This is John Smith," the phrase "This is" is an introductory phrase and "John Smith" is a name. Where the monitored communications include an introductory term or phrase within a predetermined proximity to a name, the notification module 260 may determine that a contact associated with that name is a participant in the communication.

After a contact is identified as being a participant in the communication, at 308, notification information 273 associated with the contact identified at 1002 is provided on the electronic device 201 (FIG. 1). 308 is discussed in greater detail above with reference to FIG. 3.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present disclosure are not limited to any particular operating system, system architecture, mobile device architecture, server architecture, or computer programming language.

The various example embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described example embodiments may be selected to create alternative embodiments comprised of a sub-combination of features which may not be explicitly described above. In addition, features from one or more of the above-described example embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method, performed by a processor of an electronic device, for facilitating communications, the method comprising:

monitoring audio based communications;

performing an audio analysis on the monitored audio based communications to identify a contact associated with the monitored communications;

providing a reminder associated with the identified contact on an output interface associated with the electronic device, wherein the reminder comprises a text-based note indicating a subject or topic for conversation; and while the reminder is provided, providing a selectable option to dismiss the reminder, wherein dismissing the reminder prevents the reminder from being provided if the contact is identified in subsequent audio based communications, such that the particular subject or topic for conversation identified in the reminder is not subsequently provided for the same contact.

2. The method of claim 1, further comprising, prior to providing the information associated with the contact:

storing the reminder in a memory and associating the reminder with the contact.

3. The method of claim 2, further comprising, prior to providing the reminder associated with the contact:

determining whether the identified contact is associated with a reminder and wherein providing the reminder associated with the identified contact occurs in response to determining that the identified contact is associated with the reminder.

4. The method of claim 1 wherein performing an audio analysis comprises performing a voice identification analysis on the audio based communications to determine whether a voice of a participant in the monitored communication matches a voice signature associated with the contact.

5. The method of claim 4, further comprising, prior to performing the voice identification analysis:

associating the voice signature with the contact.

6. The method of claim 5, further comprising, prior to associating the voice signature with the contact:

obtaining the voice signature for the contact.

7. The method of claim 6, wherein obtaining the voice signature for the contact comprises:

monitoring audio based communications;

identifying, from the audio based communications, a voice signature which does not correspond with previously stored voice signatures; and generating a prompt to allow a user to associate the identified voice signature with a contact.

8. The method of claim 6, wherein obtaining the voice signature for the contact comprises:

monitoring a phone call on the electronic device;

identifying, from the phone call, a voice signature; and associating the identified voice signature with a contact based on caller identification information associated with the phone call.

9. The method of claim 6, wherein obtaining the voice signature for the contact comprises:

receiving a selection of the contact at the electronic device;

initiating an outgoing audio based communication on the electronic device to the selected contact;

identifying, from that audio based communication to the selected contact, a voice signature; and associating the identified voice signature with the selected contact.

10. The method of claim 4, wherein obtaining the voice signature for the contact comprises:

receiving an electronic message from the contact, the electronic message containing the voice signature; and storing the received voice signature in memory of the electronic device; and associating the received voice signature with the contact from which the electronic message was received.

11. The method of claim 1, further comprising, prior to performing the audio analysis, storing a voice signature associated with a user of the electronic device, and wherein performing an audio analysis comprises filtering out the portion of the monitored communications that are associated with the voice signature of the user of the electronic device.

12. The method of claim 1, wherein performing an audio analysis comprises performing a speech recognition analysis to determine whether the monitored communications include one or more identifiers associated with the contact.

13. The method of claim 12, wherein the one or more identifiers associated with the contact specifies one or more name associated with the contact.

14. The method of claim 1, wherein monitoring communications comprises monitoring local conversations through a microphone.

15. The method of claim 1, wherein monitoring communications comprises monitoring a phone call on the electronic device.

16. The method of claim 1, further comprising:

receiving timing information, the timing information specifying one or more times during which the reminder associated with the identified contact may be provided; and prior to providing the reminder associated with the identified contact, determining if a time of the audio based communication is within the one or more times specified in the timing information and, if not, suppressing the reminder associated with the identified contact from being provided.

17. The method of claim 1, further comprising:

receiving black-out information specifying one or more black-out periods during which the reminder associated with the identified contact should not be provided; and prior to providing the reminder associated with the identified contact, determining if a time of the audio based communication is within the black-out period specified by the black-out information and, if so, suppressing the reminder associated with the identified contact from being provided.

18. The method of claim 1, further comprising:

receiving communication type information specifying one or communication types associated with the reminder associated with the identified contact; and prior to providing the reminder associated with the identified contact, determining if a type of the audio based communication corresponds to the communication types associated with the communication type information and, if not, suppressing the reminder associated with the identified contact from being provided.

19. The method of claim 1, further comprising:

receiving a private communication indicator specifying whether the reminder associated with the identified contact is only to be provided during private communications; and prior to providing the reminder associated with the identified contact, if the private communication indicator specifies that the reminder is only to be provided during private communications, then determining if the audio based communication is a private communication and, if not, suppressing the reminder associated with the identified contact from being provided.

20. An electronic device comprising:

a processor; and a memory coupled to the processor, the memory storing processor readable instructions for causing the processor to:

monitor audio based communications;

perform an audio analysis on the monitored audio based communications to identify a contact associated with the monitored communications;

provide a reminder associated with the identified contact on an electronic device, wherein the reminder comprises a text-based note indicating a subject or topic for conversation; and while the reminder is provided, providing a selectable option to dismiss the reminder, wherein dismissing the reminder prevents the reminder from being provided if the contact is identified in subsequent audio based communications, such that the particular subject or topic for conversation identified in the reminder is not subsequently provided for the same contact.

* * * * *